United States Patent
Okeya et al.

(10) Patent No.: US 10,928,093 B2
(45) Date of Patent: Feb. 23, 2021

(54) HEAT EXCHANGE VENTILATOR

(71) Applicant: Mitsubishi Electric Corporation, Tokyo (JP)

(72) Inventors: Kenta Okeya, Tokyo (JP); Kohei Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/343,654

(22) PCT Filed: Dec. 13, 2016

(86) PCT No.: PCT/JP2016/087102
§ 371 (c)(1),
(2) Date: Apr. 19, 2019

(87) PCT Pub. No.: WO2018/109844
PCT Pub. Date: Jun. 21, 2018

(65) Prior Publication Data
US 2019/0293319 A1    Sep. 26, 2019

(51) Int. Cl.
*F24F 3/14*    (2006.01)
*F24F 12/00*    (2006.01)
(Continued)

(52) U.S. Cl.
CPC .............. *F24F 12/001* (2013.01); *F24F 6/00* (2013.01); *F24F 7/007* (2013.01); *F24F 7/08* (2013.01);
(Continued)

(58) Field of Classification Search
CPC .. F24F 12/001; F24F 6/00; F24F 7/007; F24F 7/08; F24F 11/0001; F24F 12/00; F24F 2110/70; F24F 2011/0002; Y02B 30/563
(Continued)

(56) References Cited

U.S. PATENT DOCUMENTS 9,797,620 B2 * 10/2017 Matsugi .................... F24F 11/74
2013/0048267 A1 * 2/2013 Koretomo ................. F24F 11/81
165/300
2013/0180700 A1 * 7/2013 Aycock ................. F24F 11/0001
165/248

FOREIGN PATENT DOCUMENTS

CN    203323307 U    12/2013
EP    2650617 A1    10/2013
(Continued)

OTHER PUBLICATIONS

Office Action dated Jan. 7, 2020, issued in corresponding Japanese Patent Application No. 2018-556074, 6 pages including 4 pages of English translation.
(Continued)

*Primary Examiner* — Henry T Crenshaw
*Assistant Examiner* — Kamran Tavakoldavani
(74) *Attorney, Agent, or Firm* — Buchanan Ingersoll & Rooney PC

(57) ABSTRACT

A heat exchange ventilator includes: a partition wall that has a bypass opening allowing an exhaust air duct upstream of a total heat exchanger to communicate with the exhaust air duct between the total heat exchanger and a humidifier, and separates the exhaust air duct upstream of the total heat exchanger and a supply air duct downstream of the total heat exchanger; a bypass damper that opens and closes the bypass opening; and a controller that performs control to open the bypass opening by the bypass damper at a first time, and close the bypass opening by the bypass damper at a second time.

5 Claims, 11 Drawing Sheets

(51) Int. Cl.
  *F24F 6/00* (2006.01)
  *F24F 7/007* (2006.01)
  *F24F 7/08* (2006.01)
  *F24F 11/00* (2018.01)
  *F24F 110/70* (2018.01)

(52) U.S. Cl.
  CPC .......... *F24F 11/0001* (2013.01); *F24F 12/00* (2013.01); *F24F 2011/0002* (2013.01); *F24F 2110/70* (2018.01); *Y02B 30/56* (2013.01)

(58) Field of Classification Search
  USPC ........................................................ 165/227
  See application file for complete search history.

(56) References Cited

FOREIGN PATENT DOCUMENTS

| | | |
|---|---|---|
| JP | H02-302539 A | 12/1990 |
| JP | H03087544 A | 4/1991 |
| JP | H04023943 U | 2/1992 |
| JP | 2002206778 A * | 7/2002 |
| JP | 4656357 B2 | 3/2011 |
| JP | 2015121356 A * | 7/2015 |

OTHER PUBLICATIONS

Office Action dated May 19, 2020, issued in corresponding Japanese Patent Application No. 2018-556074, 7 pages including 4 pages of English translation.

Extended European Search Report dated Nov. 8, 2019 for corresponding European patent application No. 16924091.8, 7 pages.

International Search Report (PCT/ISA/210) and Written Opinion (PCT/ISA/237) dated Feb. 28, 2017, by the Japan Patent Office as the International Searching Authority for International Application No. PCT/JP2016/087102.

Office Action dated Aug. 26, 2020, by the Chinese Patent Office in corresponding Chinese Patent Application No. 201680090902.6 and English translation of the Office Action. (14 pages).

Office Action (Notice of Reasons for Refusal) dated Sep. 29, 2020, by the Japanese Patent Office in corresponding Japanese Patent Application No. 2018-556074 and English translation of the Office Action. (7 pages).

* cited by examiner

HEAT EXCHANGE VENTILATOR

FIELD

The present invention relates to a heat exchange ventilator that performs ventilation while exchanging heat between a supply air flow and an exhaust air flow.

BACKGROUND

A conventional heat exchange ventilator including a body in which a supply air duct and an exhaust air duct are formed and a heat exchanger provided inside the body is used to perform ventilation while exchanging heat between outdoor air flowing through the supply air duct and indoor air flowing through the exhaust air duct. A humidifier is included in the supply air duct of the heat exchange ventilator in some cases as a measure against dry air in the winter. The heat exchange ventilator equipped with a humidifier includes one that allows warm air heated by a built-in heating heater to pass through the humidifier and one that does not include a heating heater. With the heat exchange ventilator that does not include a heating heater for allowing warm air to pass through the humidifier, the humidification amount of the indoor air is determined by the condition of air subjected to total heat exchange in the heat exchanger. For this reason, the humidification amount of the indoor air is insufficient in some cases.

As a technique to address such a problem with the humidification amount, Patent Literature 1 discloses an air conditioner including: a bypass opening that allows an exhaust air duct upstream of a heat exchanger in the air blowing direction to communicate with a supply air duct between the heat exchanger and a humidifier; a damper that opens and closes the bypass opening; a humidity sensor that detects humidity in a room; and a carbon dioxide concentration sensor that detects the concentration of carbon dioxide in the room. The air conditioner disclosed in Patent Literature 1 controls drive of the damper according to the concentration of carbon dioxide and the humidity in the room, and allows relatively warm air in the exhaust air duct before passing through the heat exchanger to be bypassed to the supply air duct between the heat exchanger and the humidifier and flow into the humidifier, thereby increasing the humidification amount of the humidifier.

CITATION LIST

Patent Literature

Patent Literature 1: Japanese Patent No. 4656357

SUMMARY

Technical Problem

However, the air conditioner disclosed in Patent Literature 1 cannot allow the indoor air to be bypassed to the supply air duct and flow into the humidifier when the carbon dioxide concentration in the room is always high, thereby failing to increase the humidification amount in the humidifier. The air conditioner disclosed in Patent Literature 1 thus cannot allow the humidity of the indoor air to get to desired indoor humidity when the carbon dioxide concentration in the room is always high. Moreover, the air conditioner disclosed in Patent Literature 1 cannot allow the indoor air to be properly bypassed to the supply air duct when the carbon dioxide concentration sensor fails. A proper amount of ventilation cannot be secured as a result.

Furthermore, in order to increase the humidification amount of the indoor air, a heating air conditioning coil is mounted on the air inflow side of the humidifier in some cases to perform humidification with the humidifier by allowing the air heated by the air conditioning coil to pass through the humidifier. However, the air supplied into the room is heated and humidified while the room is being ventilated, so that the humidity in the room is decreased by ventilation. As a result, large amounts of power and time are required for heating the air conditioning coil before the desired indoor humidity is reached. More power and time are required especially when the desired indoor humidity is to be reached from the start of a humidifying operation.

The present invention has been made in view of the above, and an object of the present invention is to provide a heat exchange ventilator that can increase the humidity of indoor air in a short time with a small amount of power.

Solution to Problem

In order to solve the above problem and achieve the object, a heat exchange ventilator according to the present invention includes: a body in which an exhaust air duct for exhausting air in a room to the outside of the room and a supply air duct for supplying air outside the room into the room are formed independently; a supply blower provided in the supply air duct; an exhaust blower provided in the exhaust air duct; a heat exchanger provided in the body and allowing heat exchange between air flowing through the supply air duct and air flowing through the exhaust air duct; and a humidifier disposed downstream of the heat exchanger in the supply air duct. The heat exchange ventilator further includes: a partition wall that has a bypass opening allowing the exhaust air duct upstream of the heat exchanger to communicate with the supply air duct between the heat exchanger and the humidifier, and separates the exhaust air duct upstream of the heat exchanger and the supply air duct downstream of the heat exchanger; an opening/closing part that opens and closes the bypass opening; and a controller that performs control to open the bypass opening by the opening/closing part at a first time set in advance, and close the bypass opening by the opening/closing part at a second time set in advance.

Advantageous Effects of Invention

The heat exchange ventilator according to the present invention can increase the humidity of indoor air in a short time with a small amount of power.

DESCRIPTION OF EMBODIMENTS

A heat exchange ventilator according to embodiments of the present invention will now be described in detail with reference to the drawings. Note that the present invention is not limited to the embodiments.

First Embodiment

Figure 1:
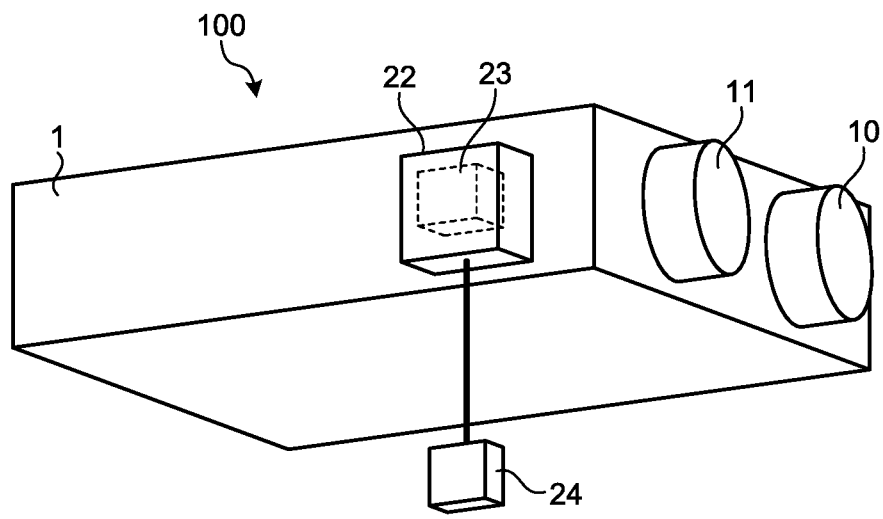
FIG. 1 is a schematic view illustrating the appearance of a heat exchange ventilator according to a first embodiment of the present invention.
Figure 2:
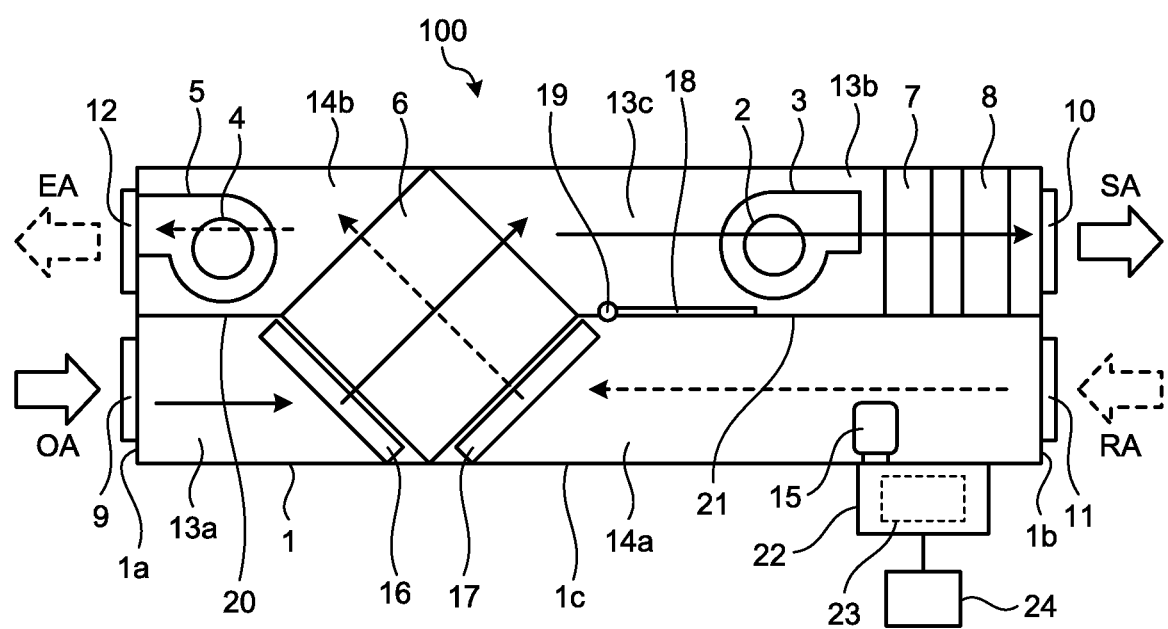
FIG. 2 is a general schematic view of the heat exchange ventilator that is seen through from the upper surface side thereof, according to the first embodiment of the present invention.
Figure 3:
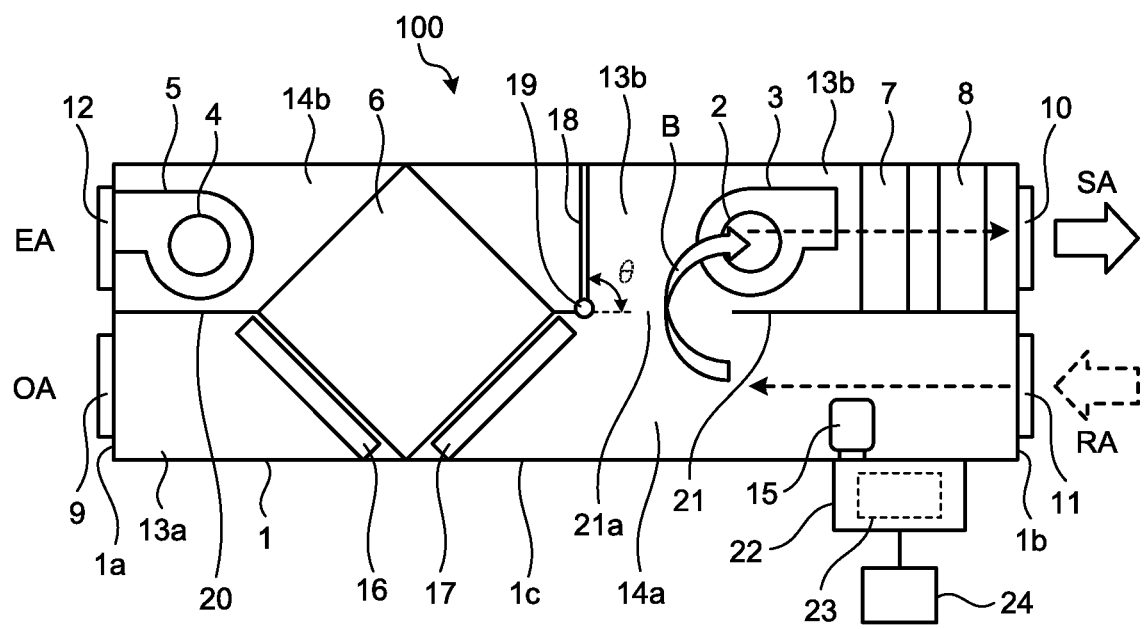
FIG. 3 is a general schematic view of the heat exchange ventilator that is seen through from the upper surface side thereof, according to the first embodiment of the present invention.

FIG. 1 is a schematic view illustrating the appearance of a heat exchange ventilator 100 according to a first embodiment of the present invention. FIG. 2 is a general schematic view of the heat exchange ventilator 100 that is seen through from the upper surface side thereof, according to the first embodiment of the present invention. FIG. 3 is a general schematic view of the heat exchange ventilator 100 that is seen through from the upper surface side thereof, according to the first embodiment of the present invention. FIG. 2 illustrates a state in which a bypass opening 21a is closed. FIG. 3 illustrates a state in which the bypass opening 21a is open. Arrows in FIGS. 2 and 3 indicate directions of flow of a supply air flow or an exhaust air flow.

The heat exchange ventilator 100 is a ceiling-concealed outdoor air processing unit that is disposed while hidden above the ceiling. The heat exchange ventilator 100 includes a housing 1 made of metal and having a rectangular parallelepiped shape that forms a body. An outdoor inlet 9, an indoor outlet 10, an indoor inlet 11, an outdoor outlet 12, and a control box 22 are provided on side surfaces of the housing 1.

The outdoor inlet 9, the indoor outlet 10, the indoor inlet 11, and the outdoor outlet 12 are each formed as a duct connection flange that is connected to a duct (not illustrated). The outdoor inlet 9 and the outdoor outlet 12 are provided on one side surface 1a of the housing 1 and each communicate with the outdoor space via the duct communicating with the outside of a building. The indoor outlet 10 and the indoor inlet 11 are provided on another side surface 1b of the housing 1 facing the one side surface 1a, and each communicate with the indoor space via the duct communicating with the inside of a room.

The housing 1 includes therein a supply blower 3, an exhaust blower 5, a total heat exchanger 6, an air conditioning coil 7, a humidifier 8, a temperature-humidity sensor 15, a supply air filter 16, an exhaust air filter 17, a bypass damper 18, a partition wall 20, and a partition wall 21.

A heat exchange element which is the total heat exchanger 6 includes a heat exchanger supply air duct and a heat exchanger exhaust air duct formed independently of each other and each having a multilayer structure of a corrugated sheet that is formed by bonding corrugated paper to flat paper. The heat exchanger supply air duct and the heat exchanger exhaust air duct are provided to cross in the total heat exchanger 6. As a result, the total heat exchanger 6 is capable of total heat exchange that exchanges heat and moisture between air flowing through the heat exchanger supply air duct and air flowing through the heat exchanger exhaust air duct. In the first embodiment, the heat exchanger supply air duct and the heat exchanger exhaust air duct are placed orthogonal to each other in the total heat exchanger 6. That is, in the total heat exchanger 6, the direction of travel of the air flowing through the heat exchanger supply air duct is orthogonal to the direction of travel of the air flowing through the heat exchanger exhaust air duct.

The housing 1 includes therein a supply air duct and an exhaust air duct that are formed independently of each other, where the supply air duct allows the outdoor inlet 9 and the indoor outlet 10 to communicate with each other via the heat exchanger supply air duct of the total heat exchanger 6 while the exhaust air duct allows the indoor inlet 11 and the outdoor outlet 12 to communicate with each other via the heat exchanger exhaust air duct of the total heat exchanger 6. That is, the interior of the housing 1 is provided with the supply air duct that connects the outside of a building and the inside of a room through the outdoor inlet 9 and the indoor outlet 10 to supply air outside the building into the room, and the exhaust air duct that connects the inside of the room and the outside of the building through the indoor inlet 11 and the outdoor outlet 12 to exhaust air inside the room to the outside of the room.

The supply air duct is divided into an upstream supply air duct 13a, the heat exchanger supply air duct described above, and a downstream supply air duct 13b. The upstream supply air duct 13a is the supply air duct upstream of the total heat exchanger 6 and is a ventilation passage for a supply air flow from the outdoor inlet 9 to the total heat exchanger 6. The heat exchanger supply air duct is a ventilation passage for a supply air flow in the total heat exchanger 6. The downstream supply air duct 13b is the supply air duct downstream of the total heat exchanger 6 and is a ventilation passage for a supply air flow from the total heat exchanger 6 to the indoor outlet 10. The supply air flow is a flow of outdoor air drawn in through the outdoor inlet 9 and supplied into a room through the indoor outlet 10.

The exhaust air duct is divided into an upstream exhaust air duct 14a, the heat exchanger exhaust air duct described above, and a downstream exhaust air duct 14b. The upstream exhaust air duct 14a is the exhaust air duct upstream of the total heat exchanger 6 and is a ventilation passage for an exhaust air flow from the indoor inlet 11 to the total heat exchanger 6. The heat exchanger exhaust air duct is a ventilation passage for an exhaust air flow in the total heat exchanger 6. The downstream exhaust air duct 14b is a ventilation passage for an exhaust air flow from the total heat exchanger 6 to the outdoor outlet 12. The exhaust air flow is a flow of indoor air drawn in through the indoor inlet 11 and exhausted to the outside of a room through the outdoor outlet 12.

The supply blower 3 is installed on a downstream side of the supply air duct, that is, in the downstream supply air duct 13b, and is driven by a supply blower motor 2 to generate a flow of the supply air flow from an inlet end toward an outlet end of the supply air duct. The supply blower 3 is driven to cause the outdoor air to be drawn in through the outdoor inlet 9, pass through the total heat exchanger 6, and be supplied to the indoor space through the indoor outlet 10.

The exhaust blower 5 is installed on a downstream side of the exhaust air duct, that is, in the downstream exhaust air duct 14b, and is driven by an exhaust blower motor 4 to generate a flow of the exhaust air flow from an inlet end toward an outlet end of the exhaust air duct. The exhaust blower 5 is driven to cause the indoor air to be drawn in through the indoor inlet 11, pass through the total heat exchanger 6, and be exhausted to the outdoor space through the outdoor outlet 12.

The air conditioning coil 7 is disposed downstream of the supply blower 3 in the downstream supply air duct 13b and heats or cools the supply air flow passing through the downstream supply air duct 13b. The humidifier 8 is disposed downstream of the air conditioning coil 7 in the downstream supply air duct 13b and humidifies the supply air flow passing through the air conditioning coil 7 in the downstream supply air duct 13b. The air conditioning coil 7 is connected to refrigerant piping and allows passage of a refrigerant through the coil. The air conditioning coil 7 is a heat exchanger that can heat or cool supply air passing through the air conditioning coil 7 by allowing heat exchange between the supply air supplied from the supply blower 3 and the refrigerant supplied from the refrigerant piping. That is, when the supply air supplied from the total heat exchanger 6 passes through the air conditioning coil 7, the air conditioning coil 7 heats the supply air passing therethrough and supplies it to the humidifier 8. Alternatively, when the supply air supplied from the total heat exchanger 6 passes through the air conditioning coil 7, the air conditioning coil 7 cools the supply air passing therethrough and supplies it to the humidifier 8.

The air conditioning coil 7 thus adjusts the humidification amount of the air blown out through the indoor outlet 10 and the temperature of the air blown out through the indoor outlet 10 according to the heating amount. As a result, the air conditioning coil 7 can control the humidification amount in the humidifier 8 and control the temperature of the air blown out through the indoor outlet 10.

In the first embodiment, the air conditioning coil 7 is connected to an outdoor unit of an air conditioner through the refrigerant piping. The refrigerant flows into the air conditioning coil 7 from the outdoor unit through the refrigerant piping. Note that the illustration of the outdoor unit of the air conditioner and the refrigerant piping connected to the air conditioning coil 7 is omitted. Alternatively, a dedicated outdoor unit instead of the outdoor unit of the air conditioner can be used to allow the refrigerant to flow into the air conditioning coil 7.

A drop evaporative humidifier can be used as the humidifier 8. The drop evaporative humidifier performs humidification by wetting a humidifying material having moisture-containing property with water dropping from the top, and evaporating water contained in the humidifying material by the supply air flow. Thus, there is no problem of reduction in the humidification capacity caused by clogging of a permeable film that occurs when a permeable film humidifier is used.

Note that in FIG. 2, a reference character "OA" indicates outdoor air, a reference character "SA" indicates supply air, a reference character "RA" indicates return air, and a reference character "EA" indicates exhaust air.

The outdoor air OA flows into the upstream supply air duct 13a through the outdoor inlet 9 from outside a room via the duct communicating with the outside of a building. After flowing into the upstream supply air duct 13a, the supply air flow passes through the total heat exchanger 6, the supply blower 3, the air conditioning coil 7, and the humidifier 8 and reaches the indoor outlet 10. The supply air flow that has reached the indoor outlet 10 is blown out into a room as the supply air SA.

The return air RA flows into the upstream exhaust air duct 14a through the indoor inlet 11 from inside the room via the duct communicating with the inside of the room. After flowing into the upstream exhaust air duct 14a, the exhaust air flow passes through the total heat exchanger 6 and the exhaust blower 5 and reaches the outdoor outlet 12. The exhaust air flow that has reached the outdoor outlet 12 is blown out to the outside of the room as the exhaust air EA.

The temperature-humidity sensor 15 is disposed in the upstream exhaust air duct 14a and detects the temperature and humidity of the air passing through the upstream exhaust air duct 14a, that is, the temperature and humidity of the indoor air. The temperature-humidity sensor 15 detects the temperature and humidity of the indoor air with a predetermined cycle set in advance while the power of the heat exchange ventilator 100 is turned on, and outputs information on the temperature and humidity of the indoor air detected to a controller 23. Note that the temperature-humidity sensor 15 may be driven under the control of the controller 23. Moreover, the temperature-humidity sensor 15 may be configured such that a temperature sensor and a humidity sensor are provided separately.

The supply air filter 16 is detachably installed on a surface of the total heat exchanger 6 receiving an inflow of the supply air flow. The exhaust air filter 17 is detachably installed on a surface of the total heat exchanger 6 receiving an inflow of the exhaust air flow. The supply air filter 16 is provided for the purpose of preventing clogging of the total heat exchanger 6 due to dust or the like mixed in the outdoor air. The exhaust air filter 17 is provided for the purpose of preventing clogging of the total heat exchanger 6 due to dust or the like mixed in the indoor air.

The downstream supply air duct 13b and the downstream exhaust air duct 14b are partitioned by the total heat exchanger 6. The upstream supply air duct 13a and the upstream exhaust air duct 14a are partitioned by the total heat exchanger 6. The upstream supply air duct 13a and the downstream exhaust air duct 14b are partitioned by the partition wall 20 as a flat plate. The upstream exhaust air duct 14a and the downstream supply air duct 13b are partitioned by the partition wall 21. The bypass opening 21a is formed in the partition wall 21 and allows an upstream region 13c upstream of the supply blower 3 in the downstream supply air duct 13b, that is, a region between the total heat exchanger 6 and the supply blower 3 in the downstream supply air duct 13b, to communicate with the upstream exhaust air duct 14a.

The bypass damper 18, which is an opening/closing part for opening and closing the bypass opening 21a, is disposed in the downstream supply air duct 13b. The bypass opening 21a is provided between the upstream exhaust air duct 14a and the downstream supply air duct 13b for the purpose of allowing at least some of the exhaust air flow through the upstream exhaust air duct 14a to flow to the downstream supply air duct 13b, that is, bypassing the exhaust air flow through the upstream exhaust air duct 14a to the downstream supply air duct 13b.

The bypass damper 18 is formed of a plate that turns about an axis along the partition wall 21, for example, and is driven by a motor 19 so that one end side of the damper is displaced into the downstream supply air duct 13b. The bypass damper 18 can be displaced to a closed position at which the bypass opening 21a is closed along the partition wall 21 as illustrated in FIG. 2, and an open position at which at least some of the indoor air flowing into the upstream exhaust air duct 14a flows as a bypass flow B passing through the bypass opening 21a as illustrated in FIG. 3. Opening and closing of the bypass damper 18 is controlled by the controller 23. That is, the heat exchange ventilator 100 has a bypass function that bypasses the indoor air flowing into the upstream exhaust air duct 14a to the downstream supply air duct 13b.

When the bypass opening 21a is closed by the bypass damper 18, the upstream exhaust air duct 14a and the downstream supply air duct 13b are independent of each other so that the bypass flow B is not generated.

On the other hand, when the bypass damper 18 is opened, the upstream exhaust air duct 14a and the downstream supply air duct 13b communicate with each other via the bypass opening 21a. As a result, the bypass flow B passing through the bypass opening 21a flows into the downstream supply air duct 13b from the upstream exhaust air duct 14a. The heat exchange ventilator 100 can thus perform the humidifying operation while returning the indoor air flowing into the upstream exhaust air duct 14a from inside the room directly back to the room for circulation therein.

When fully opened, the bypass damper 18 can close a region adjacent to the total heat exchanger 6 in the downstream supply air duct 13b, that is, a region between the total heat exchanger 6 and the supply blower 3 in the downstream supply air duct 13b. That is, the bypass damper 18 is disposed at a position to close the supply air duct at a position between the total heat exchanger 6 and the humidifier 8 and upstream of the bypass opening 21a when the bypass damper is fully opened. As a result, the air flow upstream of the bypass damper 18 in the supply air duct no longer flows to the downstream supply air duct 13b so that only the bypass flow B passing through the bypass opening 21a flows into the downstream supply air duct 13b from the upstream exhaust air duct 14a. Thus, the heat exchange ventilator 100 fully opens the bypass damper 18 to bypass all the indoor air flowing into the upstream exhaust air duct 14a from inside the room to the downstream supply air duct 13b and return it to the room, thereby being able to perform the humidifying operation while circulating the indoor air. In the first embodiment, the bypass damper 18 is fully opened when an aperture θ equals 90 degrees. The aperture θ is an angle formed by the partition wall 21 and the bypass damper 18. Note that the amount of circulation of the indoor air can be adjusted by adjusting the aperture θ of the bypass damper 18.

The control box 22 houses the controller 23 and is provided on another side surface 1c of the housing 1. A remote control 24 capable of communicating with the controller 23 is connected to the control box 22. The remote control 24 receives instructions on various controls such as a ventilation operation of the heat exchange ventilator 100. The remote control 24 outputs various instructions received from a user to the controller 23. The controller 23 controls the ventilation operation of the heat exchange ventilator 100 or the like on the basis of the various instructions input from the remote control 24.

The controller 23 can communicate with the supply blower 3, the exhaust blower 5, the bypass damper 18, the temperature-humidity sensor 15, and the outdoor unit of the air conditioner. The controller 23 controls the operation of the supply blower 3 and the exhaust blower 5 by outputting a run signal that instructs running of the blower and a stop signal that instructs stopping of the blower to the supply blower 3 and the exhaust blower 5.

The controller 23 controls the opening/closing operation of the bypass damper 18 by outputting an opening operation signal that instructs an opening operation and a closing operation signal that instructs a closing operation to the bypass damper 18. Note that the opening operation signal includes aperture information that instructs the aperture θ of the bypass damper 18. The aperture θ is 90 degrees when the bypass damper 18 is fully opened. The controller 23 also receives an input of information on the temperature of the room and information on the humidity of the room from the temperature-humidity sensor 15.

On the basis of the information on the temperature and humidity of the room input from the temperature-humidity sensor 15, the controller 23 outputs a refrigerant circulation signal that instructs start of circulation of the refrigerant to the air conditioning coil 7 and a refrigerant circulation stop signal that instructs termination of circulation of the refrigerant to the air conditioning coil 7 to the outdoor unit of the air conditioner, thereby controlling heating or cooling of the air conditioning coil 7. Note that the controller 23 includes, in the refrigerant circulation signal, information instructing a heating level of the air conditioning coil 7 or a cooling level of the air conditioning coil 7.

The controller 23 also controls opening and closing of the bypass damper 18. The controller 23 can set operation start time information that specifies a circulation operation start time at which an indoor circulation humidifying operation (to be described) is started and operation end time information that specifies a circulation operation end time at which the indoor circulation humidifying operation is ended. The controller 23 can control the humidifying operation on the basis of the operation start time information and the operation end time information being set. Note that the operation start time information and the operation end time information may be stored in the remote control 24.

The controller 23 performs control to open the bypass opening 21a by opening the bypass damper 18 at the set circulation operation start time and execute the humidifying operation while circulating the indoor air by allowing the exhaust air flow flowing into the upstream exhaust air duct 14a from inside the room to flow to the downstream supply air duct 13b through the bypass opening 21a. At this time, the exhaust blower 5 of the heat exchange ventilator 100 stops, and the controller 23 performs control to run only the supply blower 3 of the heat exchange ventilator 100. Hereinafter, the indoor circulation humidifying operation refers to the humidifying operation that is performed while circulating the indoor air by allowing the exhaust air flow flowing into the upstream exhaust air duct 14a from inside the room to flow to the downstream supply air duct 13b through the bypass opening 21a.

The controller 23 also performs control to stop the indoor circulation humidifying operation at the set circulation operation end time. That is, the controller 23 performs control to close the bypass opening 21a by closing the bypass damper 18 and stop the supply blower 3. In other words, the controller 23 can perform control to open the bypass opening 21a by the opening/closing part at a first time set in advance and close the bypass opening 21a by the opening/closing part at a second time set in advance.

The controller 23 also performs control to turn on or off the supply of water to the humidifier 8 on the basis of the information on the temperature and humidity in the room input from the temperature-humidity sensor 15.

Figure 4:
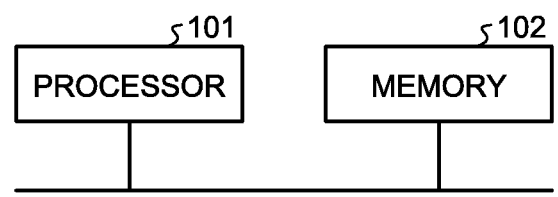
FIG. 4 is a diagram illustrating an example of the hardware configuration of a processing circuit according to an embodiment of the present invention.

The controller 23 is implemented as a processing circuit having the hardware configuration illustrated in FIG. 4, for example. FIG. 4 is a diagram illustrating an example of the hardware configuration of the processing circuit according to an embodiment of the present invention. When implemented as the processing circuit illustrated in FIG. 4, the controller 23 is implemented by a processor 101 executing a program stored in a memory 102. Alternatively, a plurality of processors and a plurality of memories may cooperatively implement the above functions. Yet alternatively, some of the functions of the controller 23 may be implemented as an electronic circuit, and the other functions may be implemented by using the processor 101 and the memory 102.

Figure 5:
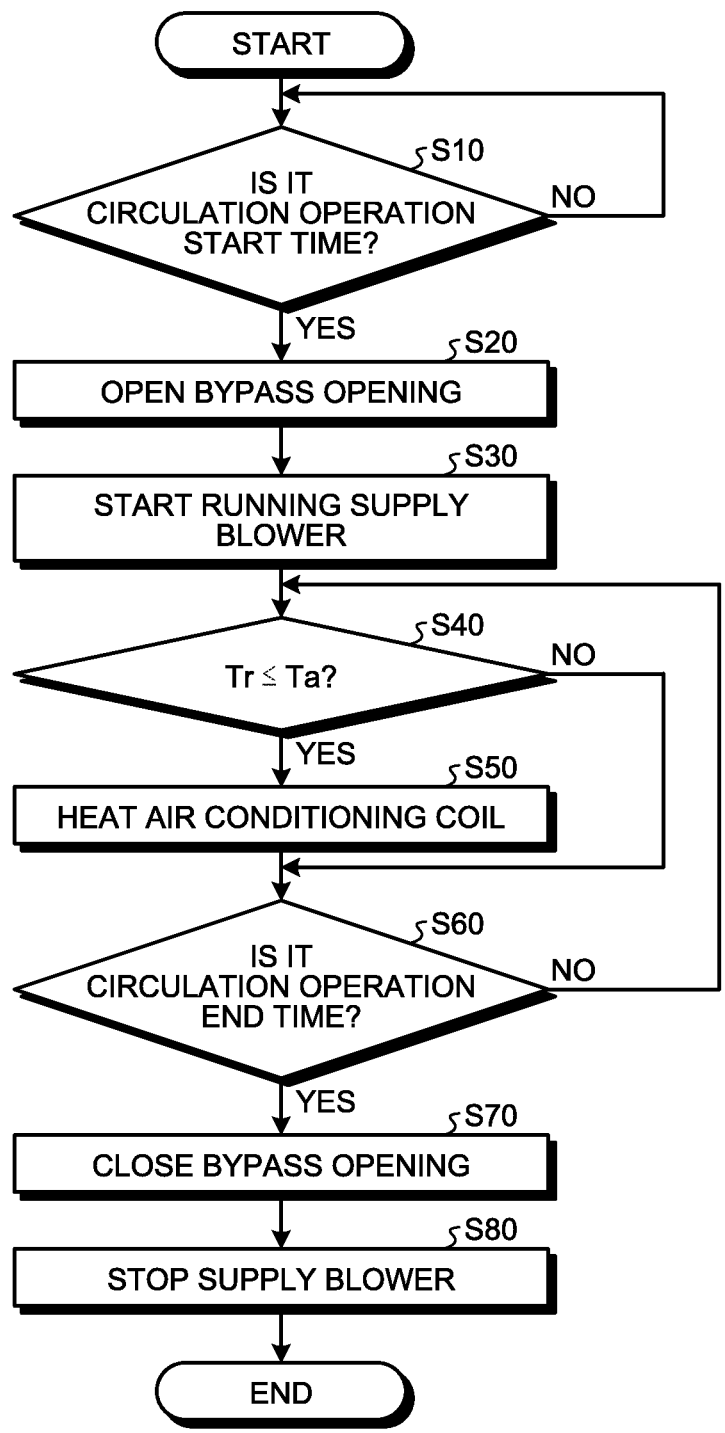
FIG. 5 is a flowchart illustrating the procedure of control of an indoor circulation humidifying operation of the heat exchange ventilator according to the first embodiment of the present invention.

Next, the operation of the heat exchange ventilator 100 according to the first embodiment of the present invention will be described. FIG. 5 is a flowchart illustrating the procedure of control of the indoor circulation humidifying operation of the heat exchange ventilator 100 according to the first embodiment of the present invention.

First, in step S10, the controller 23 determines whether or not the current time is the circulation operation start time specified in the operation start time information. If the current time is not the circulation operation start time yet, that is, if No in step S10, the controller 23 returns to step S10.

If the current time is the circulation operation start time, that is, if Yes in step S10, the controller 23 proceeds to step S20 and outputs an opening operation signal instructing an opening operation to the bypass damper 18. That is, the controller 23 performs control to open the bypass opening 21a by displacing the bypass damper 18 to the open position and opening the bypass damper 18 as illustrated in FIG. 3. Here, the opening operation signal includes aperture information instructing the aperture θ of the bypass damper 18 set to full opening, or the aperture of 90 degrees.

Upon receiving the opening operation signal, the bypass damper 18 is displaced to the fully opened position on the basis of the opening operation signal and the aperture information. This closes the region adjacent to the total heat exchanger 6 in the downstream supply air duct 13b, that is, the region between the total heat exchanger 6 and the supply blower 3 in the downstream supply air duct 13b. As a result, the air flow upstream of the bypass damper 18 in the supply air duct no longer flows to the downstream supply air duct 13b so that only the bypass flow B passing through the bypass opening 21a flows to the downstream supply air duct 13b from the upstream exhaust air duct 14a as illustrated in FIG. 3. Here, the bypass flow B is all the indoor air flowing into the upstream exhaust air duct 14a from inside the room. Thus, all the indoor air flowing into the upstream exhaust air duct 14a from inside the room is bypassed to the downstream supply air duct 13b and returned to the room, whereby the indoor air can be circulated.

Next, in step S30, the controller 23 performs control to start running only the supply blower 3 by outputting a run signal that instructs running to the supply blower 3 while keeping the exhaust blower 5 stopped. The supply blower 3 starts running upon receiving the run signal. This starts the indoor circulation humidifying operation. Note that the order of step S20 and step S30 may be reversed.

Next, in step S40, the controller 23 determines whether or not a detected temperature Tr, which is the latest indoor temperature detected by the temperature-humidity sensor 15, is lower than or equal to a predetermined reference temperature Ta. If the detected temperature Tr is higher than the predetermined reference temperature Ta, that is, if No in step S40, the controller 23 does not heat the air conditioning coil 7 and proceeds to step S60. Therefore, in this case, the indoor circulation humidifying operation is performed without heating of the supply air flow by the air conditioning coil 7.

If the detected temperature Tr is lower than or equal to the predetermined reference temperature Ta, that is, if Yes in step S40, the controller 23 proceeds to step S50 and performs control to heat the air conditioning coil 7 by outputting a refrigerant circulation signal instructing the start of circulation of the refrigerant to the air conditioning coil 7 to the outdoor unit of the air conditioner. Here, the heating level of the air conditioning coil 7 is set to 100%. As a result, the indoor circulation heating-humidifying operation is performed with the supply air flow heated by the air conditioning coil 7.

Next, in step S60, the controller 23 determines whether or not the current time is the circulation operation end time specified in the operation end time information. If the current time is not the circulation operation end time yet, that is, if No in step S60, the controller 23 returns to step S40.

If the current time is the circulation operation end time, that is, if Yes in step S60, the controller 23 proceeds to step S70 and performs control to close the bypass opening 21a by outputting a closing operation signal that instructs a closing operation to the bypass damper 18 and closing the bypass damper 18 by causing the bypass damper 18 to be displaced to the closed position as illustrated in FIG. 2.

Note that the circulation operation end time is set to a time at which the humidity in the room can reach desired indoor humidity by the indoor circulation humidifying operation started at the circulation operation start time. The circulation operation end time is preferably determined by experimentally verifying in advance operation time data that indicates a relationship between the humidity of the indoor air at the start of operation and the operation time required until the humidity in the room reaches the desired indoor humidity. The operation time data is used to be able to set the circulation operation end time to the time at which the humidity in the room is to reach the desired indoor humidity, and inversely calculate the circulation operation start time.

Next, in step S80, the controller 23 performs control to stop the supply blower 3 by outputting a stop signal that instructs stopping to the supply blower 3. This ends the indoor circulation humidifying operation. Note that the order of step S70 and step S80 may be reversed.

In the heat exchange ventilator 100, as described above, the controller 23 performs control to start the indoor circulation humidifying operation at the predetermined operation start time and end the indoor circulation humidifying operation at the predetermined operation end time. This allows the indoor air, which is relatively warmer than the air passing through the total heat exchanger 6, to be bypassed to the downstream supply air duct 13b between the total heat exchanger 6 and the air conditioning coil 7 and circulated in the room, whereby the indoor air can be humidified in a predetermined period while preventing a decrease in the humidity of the indoor air by ventilation. As a result, the heat exchange ventilator 100 can greatly cut the time before the humidity of the indoor air reaches the desired indoor humidity which is a target value of the humidity of the indoor air.

The heat exchange ventilator 100 fully opens the bypass damper 18 and closes the region between the total heat exchanger 6 and the supply blower 3 in the downstream supply air duct 13b, thereby preventing the air flow upstream of the bypass damper 18 in the supply air duct from flowing to the downstream supply air duct 13b and being able to humidify the indoor air while preventing a decrease in the humidity of the indoor air by ventilation. Thus, as compared to a method that performs humidification while ventilating, the heat exchange ventilator 100 can greatly cut the time before the humidity of the indoor air reaches the desired indoor humidity which is the target value of the humidity of the indoor air.

Moreover, the heat exchange ventilator 100 adjusts the amount of heating of the air conditioning coil 7 depending on the detected temperature and humidity in the room and allows the air heated by the air conditioning coil 7 to flow to the humidifier 8, thereby being able to increase the humidification amount of the humidifier 8 with the minimum amount of heating of the air conditioning coil 7 necessary. The indoor air can thus be humidified efficiently while saving energy. That is, when the temperature of the indoor air is high enough to not require heating of the air conditioning coil 7, the indoor air can be humidified with low power consumption by performing humidification with the humidifier 8 without heating of the air conditioning coil 7.

Moreover, when the temperature of the indoor air is at a level that requires heating of the air conditioning coil 7 and thus humidification is performed by the humidifier 8 with heating of the air conditioning coil 7, the indoor air which is relatively warm compared to the air of the supply air flow passing through the total heat exchanger 6 is heated so that the heating time of the air conditioning coil 7 can be reduced. As a result, the power required for heating of the air conditioning coil 7, that is, the power required for the outdoor unit of the air conditioner to circulate the refrigerant of a desired temperature to the air conditioning coil 7, can be reduced so that the indoor air can be heated and humidified with low power consumption.

The heat exchange ventilator 100 starts the indoor circulation humidifying operation at the predetermined operation start time and performs the humidifying operation while circulating the indoor air, whereby the indoor air can be circulated and humidified in a certain period of time before people come to the office, for example. The heat exchange ventilator 100 can therefore provide a comfortable indoor environment by the time when people start working in the room.

Moreover, the heat exchange ventilator 100 stops the exhaust blower 5 and runs only the supply blower 3 to stop exhaust of the indoor air, thereby being able to humidify the indoor air efficiently without waste and with low power consumption.

Furthermore, the heat exchange ventilator 100 properly sets the circulation operation start time and the circulation operation end time to the time before the start time of work in the office, thereby being able to circulate and humidify the indoor air in a certain period of time before many people come to the office. This can provide a comfortable indoor environment by the time when many people start working in the office.

Figure 6:
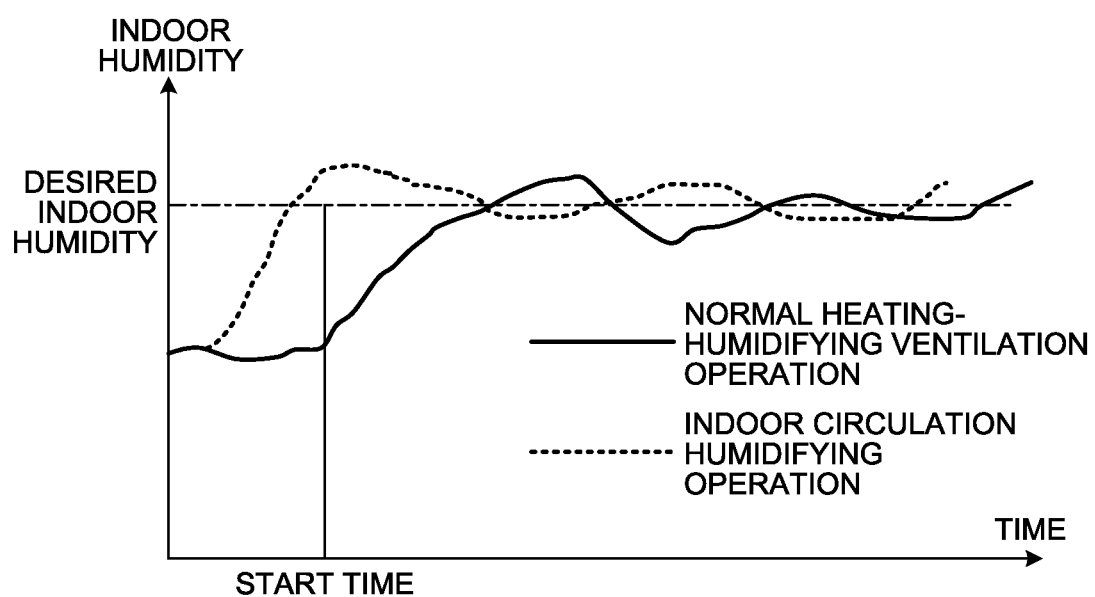
FIG. 6 is a characteristic diagram illustrating a state of humidity of indoor air when the heat exchange ventilator is used in the indoor circulation humidifying operation and in a normal heating-humidifying ventilation operation, according to the first embodiment of the present invention.

FIG. 6 is a characteristic diagram illustrating a state of humidity of the indoor air when the heat exchange ventilator 100 is used in the indoor circulation humidifying operation and in a normal heating-humidifying ventilation operation, according to the first embodiment of the present invention. The normal heating-humidifying ventilation operation is a ventilation operation for performing normal ventilation in which the supply blower 3 and the exhaust blower 5 are run while the bypass opening 21a is closed by the bypass damper 18. That is, in the normal heating-humidifying ventilation operation, the indoor air flowing into the upstream exhaust air duct 14a from inside the room is not bypassed to the downstream supply air duct 13b, so that all the indoor air flowing into the upstream exhaust air duct 14a from inside the room is exhausted. FIG. 6 illustrates a case where the indoor circulation humidifying operation and the normal heating-humidifying ventilation operation are started under the condition that the desired indoor humidity is reached at the start time of work in the office by the indoor circulation humidifying operation. FIG. 6 also illustrates a case where heating or discontinuation of heating of the air conditioning coil 7 is controlled on the basis of the humidity of the indoor air after the desired indoor humidity is reached.

As can be seen from FIG. 6, the desired indoor humidity can be reached in a shorter time when the indoor circulation humidifying operation is performed by the heat exchange ventilator 100 from a halt than when the normal heating-humidifying ventilation operation is performed by the heat exchange ventilator 100 from a halt.

When the heat exchange ventilator 100 performs the normal heating-humidifying ventilation operation after startup, the supply air flow is heated by the air conditioning coil 7 with the capacity of the refrigerant circulating from the outdoor unit to the air conditioning coil 7 set to 100%, and then humidified by the humidifier 8. The outdoor unit of the air conditioner thus uses a lot of power before the desired indoor humidity is reached. Moreover, the humidification is performed while ventilating the room, which removes moisture in the indoor air by ventilation so that it takes time for the desired indoor humidity to be reached.

On the other hand, when the heat exchange ventilator 100 performs the indoor circulation humidifying operation after startup, the indoor air is circulated without ventilating the room so that the moisture in the indoor air is not removed and the desired indoor humidity can be reached in a short time. Before the humidity of the indoor air reaches the desired indoor humidity, the indoor circulation humidifying operation also heats the air conditioning coil 7 with the capacity of the refrigerant circulating from the outdoor unit to the air conditioning coil 7 set to 100%. After the humidity of the indoor air reaches the desired indoor humidity, however, the capacity of the refrigerant circulating through the air conditioning coil 7 is reduced so that the heating-humidifying operation with reduced power consumption is performed.

Therefore, the indoor circulation humidifying operation of the heat exchange ventilator 100 can perform humidification with lower power consumption than the normal heating-humidifying ventilation operation. That is, the indoor circulation humidifying operation of the heat exchange ventilator 100 can efficiently provide a comfortable indoor environment in a short time before the start time or work.

Note that although the above description describes the case where the indoor circulation humidifying operation is performed by running only the supply blower 3 while keeping the exhaust blower 5 stopped, the exhaust blower 5 may be run together with the supply blower 3 when the bypass damper 18 is not fully opened. In this case, the supply air flow passes through the total heat exchanger 6 and the indoor air flows into the total heat exchanger 6 depending on the aperture θ of the bypass damper 18, whereby ventilation can be performed along with the indoor circulation humidifying operation.

Figure 7:
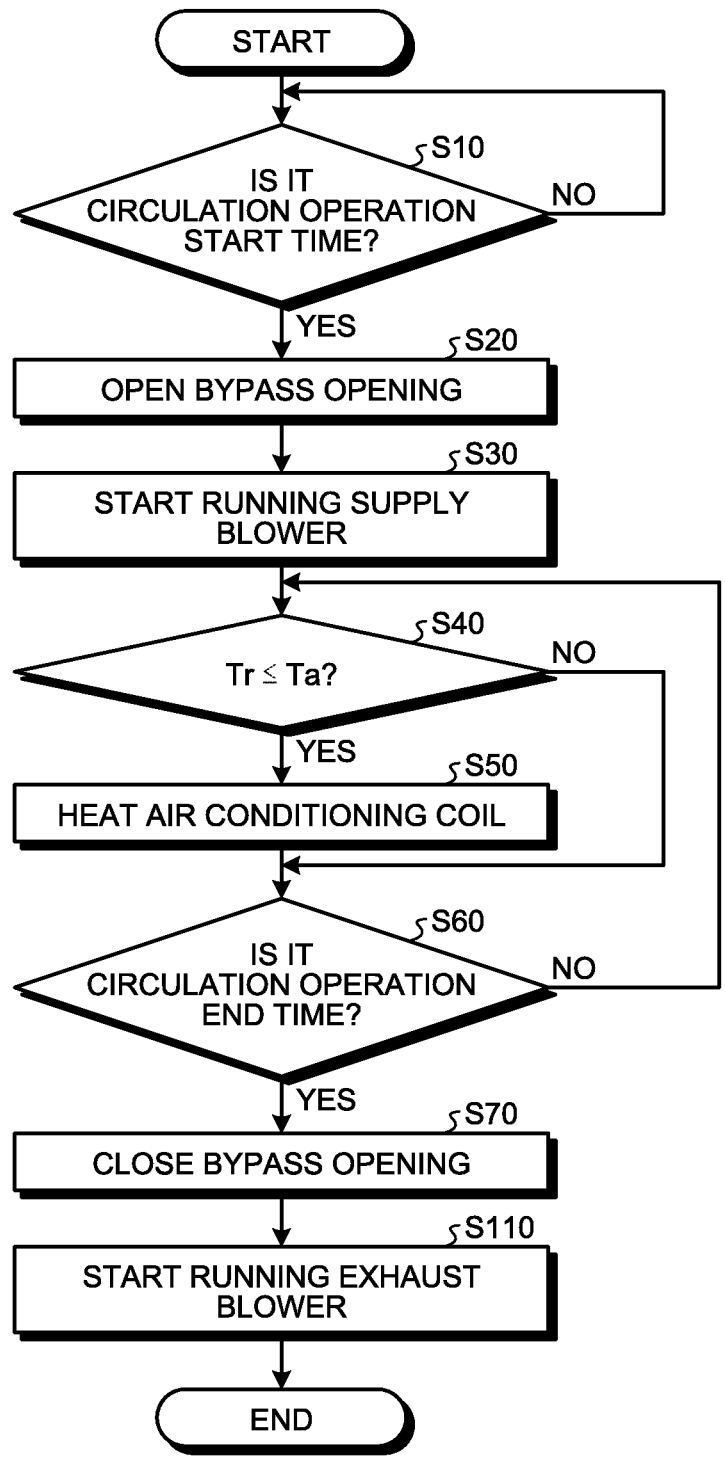
FIG. 7 is a flowchart illustrating the procedure of control to shift from the indoor circulation humidifying operation to the normal heating-humidifying ventilation operation of the heat exchange ventilator according to the first embodiment of the present invention.

The controller 23 can also perform control to automatically shift the operation to the normal heating-humidifying ventilation operation after the indoor circulation humidifying operation is stopped, the normal heating-humidifying ventilation operation performing normal ventilation in which the supply blower 3 and the exhaust blower 5 are run while the bypass opening 21a is closed by the bypass damper 18. Hereinafter, a description will be given of a case where the heat exchange ventilator 100 shifts to the normal heating-humidifying ventilation operation after the indoor circulation humidifying operation is stopped. FIG. 7 is a flowchart illustrating the procedure of control to shift from the indoor circulation humidifying operation to the normal heating-humidifying ventilation operation of the heat exchange ventilator 100 according to the first embodiment of the present invention. Note that in FIG. 7, processing identical to that of the flowchart illustrated in FIG. 5 is assigned the same step number as the step number assigned to such processing in FIG. 5.

First, the control from step S10 to step S70 illustrated in FIG. 5 is performed. Next, in step S110, the controller 23 performs control to run the exhaust blower 5 by outputting a run signal that instructs running to the exhaust blower 5 while the supply blower 3 is running. The exhaust blower 5 starts running upon receiving the run signal. As a result, the operation of the heat exchange ventilator 100 is switched from the indoor circulation humidifying operation to the normal heating-humidifying ventilation operation. Note that the order of step S70 and step S110 may be reversed.

After the desired indoor humidity is reached, the controller 23 controls heating or discontinuation of heating of the air conditioning coil 7 on the basis of the humidity of the indoor air, thereby controlling the degree of humidification of the supply air flow and controlling the humidity in the room.

Next, a description will be given of an example of operation control of the heat exchange ventilator 100 for switching between the indoor circulation humidifying operation and the normal heating-humidifying ventilation operation. For example, there are no or few people in a room to be air conditioned in a time period before the start time of work in the office. In this case, the room has a low carbon dioxide concentration and a low degree of pollution of the air. Thus, in the time period before the start time or work, the heat exchange ventilator 100 performs the operation for humidifying the indoor air to bring the indoor humidity to the predetermined desired indoor humidity. That is, the start time and the end time of a first indoor circulation humidifying operation of the day are set in the time period before the start time of work in the controller 23. The start time of the humidifying operation is set to coincide with the startup of the heat exchange ventilator 100. As a result, the heat exchange ventilator 100 can automatically and efficiently bring the humidity in the room to the desired indoor humidity by the time when many people start working in the room, and provide a comfortable indoor environment.

In this case, the heat exchange ventilator 100 does not ventilate the room so that the humidity of the air in the room is not decreased by ventilation. As a result, the air conditioning coil 7 need not be operated in the 100% heating state, that is, with the capacity of the refrigerant circulating from the outdoor unit of the air conditioner to the air conditioning coil 7 set at 100%, whereby the power required for heating of the air conditioning coil 7 can be reduced. The air conditioning coil 7 may be operated in the 100% heating state when the humidity in the room is to be brought to the desired indoor humidity in a short time. In this case as well, the humidity of the air in the room is not decreased by ventilation, so that the desired indoor humidity can be reached in a short time as compared with the case where the air conditioning coil 7 is operated at 100% while performing ventilation, and the power required for heating of the air conditioning coil 7 can be reduced since the air conditioning coil 7 is operated in the 100% heating state for a short time.

The controller 23 may also perform control to execute the indoor circulation humidifying operation temporarily for a predetermined operation time or until a predetermined humidity is reached when detecting during the normal heating-humidifying ventilation operation that the humidity in the room is lower than a predetermined reference humidity value unpleasant for people on the basis of, for example, a result of detection by the temperature-humidity sensor 15. Thereafter, the controller 23 performs control to shift the operation of the heat exchange ventilator 100 from the indoor circulation humidifying operation to the normal heating-humidifying ventilation operation.

The predetermined operation time and the predetermined humidity are set in advance in the controller 23. Although the predetermined humidity may be higher than or equal to the predetermined reference humidity value, the predetermined humidity is preferably higher than or equal to the predetermined reference humidity value and close to the desired indoor humidity, more preferably at the desired indoor humidity considering that the normal heating-humidifying ventilation operation is performed after the indoor circulation humidifying operation.

The heat exchange ventilator 100 repeats the above control to be able to bring the humidity in the room to the desired indoor humidity efficiently in a short time with low power, reduce pollution of the indoor air, and automatically provide a comfortable indoor environment.

As described above, the heat exchange ventilator 100 according to the first embodiment starts the indoor circulation humidifying operation at the predetermined operation start time and ends the indoor circulation humidifying operation at the predetermined operation end time. As a result, the heat exchange ventilator 100 can humidify the indoor air systematically and efficiently in a predetermined period while reducing or preventing a decrease in the humidity of the indoor air by ventilation, and greatly cut the time before the humidity of the indoor air reaches the desired indoor humidity which is the target value of the humidity of the indoor air.

Moreover, in the indoor circulation humidifying operation, the heat exchange ventilator 100 heats the indoor air that is relatively warmer than the supply air flow passing through the total heat exchanger 6, thereby being able to cut the heating time of the air conditioning coil 7 and perform heating and humidifying of the indoor air with low power consumption.

Therefore, the heat exchange ventilator 100 according to the first embodiment can provide a heat exchange ventilator that can increase the humidity of the indoor air in a short time with a small amount of power while reducing or preventing a decrease in the humidity of the indoor air by ventilation.

Second Embodiment

Figure 8:
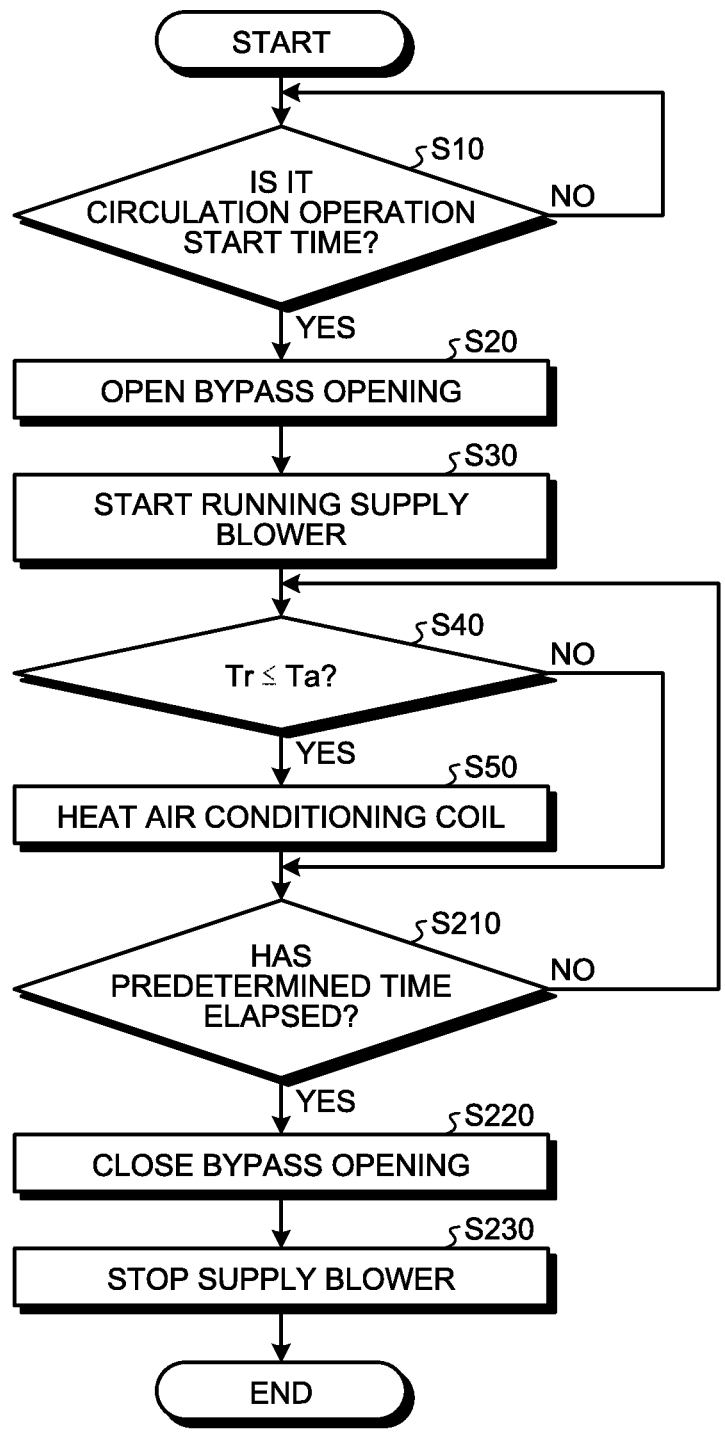
FIG. 8 is a flowchart illustrating the procedure of control of an indoor circulation humidifying operation of a heat exchange ventilator according to a second embodiment of the present invention.

A second embodiment describes another control example of the heat exchange ventilator 100. In the second embodiment, the controller 23 performs control to execute the indoor circulation humidifying operation only for a certain period of time after startup. FIG. 8 is a flowchart illustrating the procedure of control of the indoor circulation humidifying operation of the heat exchange ventilator 100 according to the second embodiment of the present invention. Note that in FIG. 8, processing identical to that of the flowchart illustrated in FIG. 5 is assigned the same step number as the step number assigned to such processing in FIG. 5.

The control from step S10 to step S50 illustrated in FIG. 5 is performed. Next, in step S210, the controller 23 determines whether or not a predetermined time has elapsed since the startup. The controller 23 returns to step S40 if the predetermined time has not elapsed, or if No in step S210. The predetermined time is set in advance in the controller 23. Note that the predetermined time may be stored in the remote control 24.

If the predetermined time has elapsed since the startup, that is, if Yes in step S210, the controller 23 proceeds to step S220 and performs control to close the bypass opening 21*a* by outputting a closing operation signal that instructs a closing operation to the motor 19 and closing the bypass damper 18 by causing the bypass damper 18 to be displaced to the closed position as illustrated in FIG. 2.

Note that the predetermined time is set to a time at which the heat exchange ventilator 100 can bring the humidity in the room to the desired indoor humidity by starting the indoor circulation humidifying operation at the circulation operation start time from a halt, that is, a time at which the humidity in the room can reach the desired indoor humidity after the startup. The predetermined time is preferably determined by experimentally verifying in advance operation time data that indicates a relationship between the humidity of the indoor air at the startup and the operation time required until the humidity in the room reaches the desired indoor humidity. The operation time data is used to be able to set the predetermined time to the time at which the humidity in the room is to reach the desired indoor humidity, and inversely calculate the circulation operation start time.

Next, in step S230, the controller 23 performs control to stop the supply blower 3 by outputting a stop signal that instructs stopping to the supply blower 3. This ends the indoor circulation humidifying operation. Note that the order of step S220 and step S230 may be reversed.

Moreover, as is the case in the first embodiment, the controller 23 can perform control to automatically shift the operation to the normal heating-humidifying ventilation operation after the indoor circulation humidifying operation is stopped, the normal heating-humidifying ventilation operation performing normal ventilation in which the supply blower 3 and the exhaust blower 5 are run while the bypass opening 21*a* is closed by the bypass damper 18.

As with the first embodiment, the second embodiment can perform humidification of the indoor air efficiently without waste and with low power consumption, thereby being able to greatly cut the time before the humidity of the indoor air reaches the desired indoor humidity which is the target value of the humidity of the indoor air. As with the first embodiment, the second embodiment properly sets the circulation operation start time and the predetermined time to be able to provide a comfortable indoor environment at a desired time in a short time.

Third Embodiment

Figure 9:
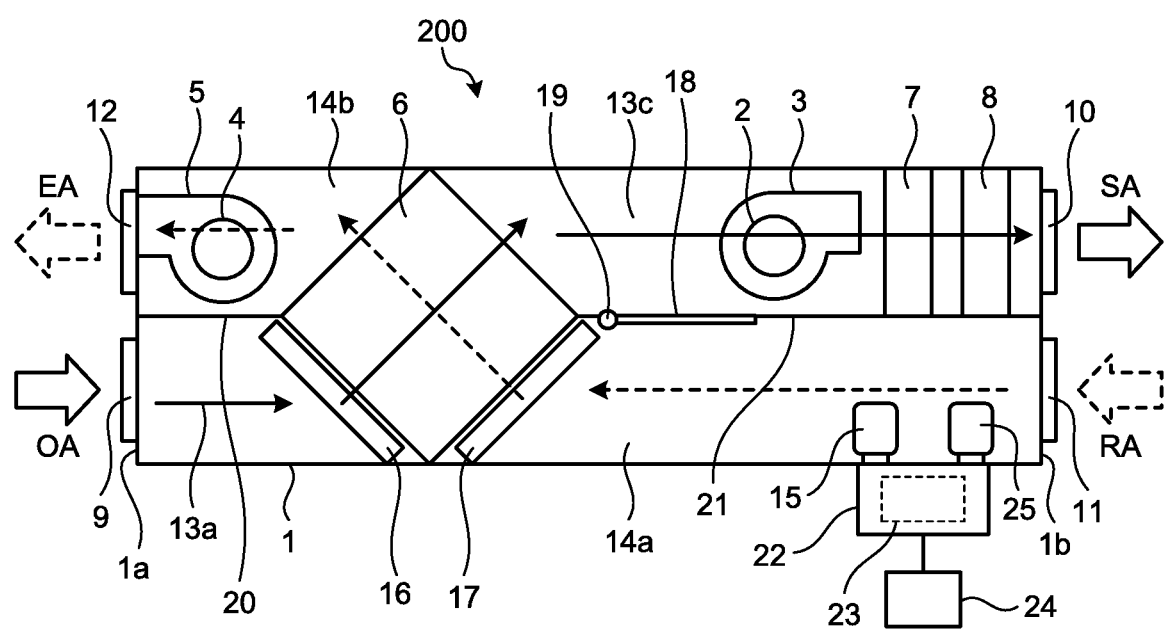
FIG. 9 is a general schematic view of a heat exchange ventilator that is seen through from the upper surface side thereof, according to a third embodiment of the present invention.

A third embodiment describes a case where the indoor circulation humidifying operation is performed only when a carbon dioxide concentration in the room is lower than or equal to a predetermined reference carbon dioxide concentration value. FIG. 9 is a general schematic view of a heat exchange ventilator 200 that is seen through from the upper surface side thereof, according to the third embodiment of the present invention. The heat exchange ventilator 200 according to the third embodiment has a configuration in which a carbon dioxide sensor 25 is added to the heat exchange ventilator 100 according to the first embodiment.

The carbon dioxide sensor 25 is disposed in the upstream exhaust air duct 14*a* and detects the carbon dioxide concentration of the air passing through the upstream exhaust air duct 14*a*, that is, the carbon dioxide concentration of the indoor air. The carbon dioxide sensor 25 can communicate with the controller 23. The carbon dioxide sensor 25 detects the carbon dioxide concentration of the indoor air with a predetermined cycle set in advance while the power of the heat exchange ventilator 200 is turned on, and outputs information on the carbon dioxide concentration detected to the controller 23. Note that the carbon dioxide sensor 25 may be driven under the control of the controller 23.

Figure 10:
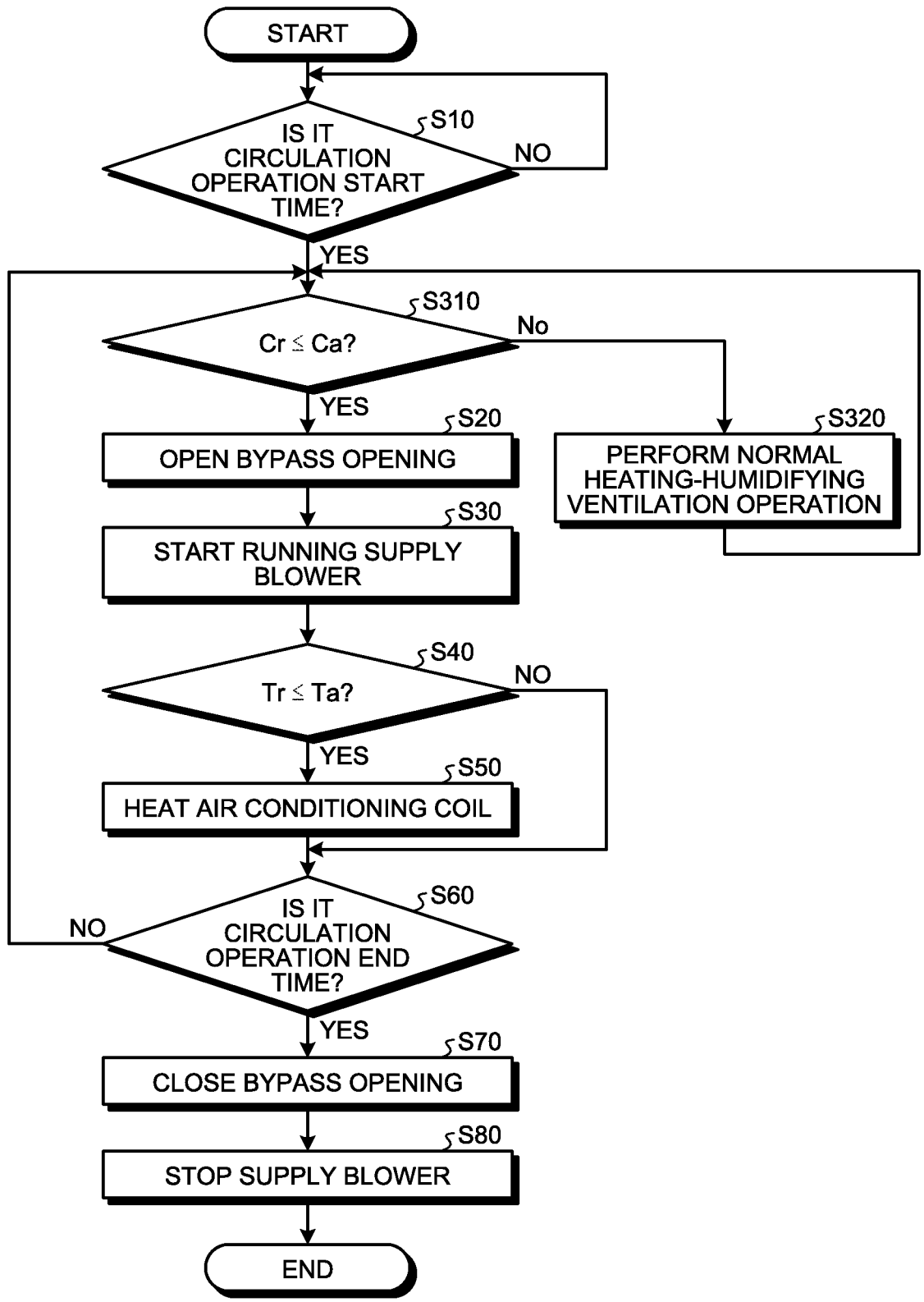
FIG. 10 is a flowchart illustrating the procedure of control of an indoor circulation humidifying operation of the heat exchange ventilator according to the third embodiment of the present invention.

Next, the operation of the heat exchange ventilator 200 according to the third embodiment of the present invention will be described. FIG. 10 is a flowchart illustrating the procedure of control of the indoor circulation humidifying operation of the heat exchange ventilator 200 according to the third embodiment of the present invention. Note that processing identical to that of the flowchart illustrated in FIG. 5 is assigned the same step number as the step number assigned to such processing in FIG. 5.

First, in step S10, the controller 23 determines whether or not the current time is the circulation operation start time specified in the operation start time information. If the current time is not the circulation operation start time yet, that is, if No in step S10, the controller 23 returns to step S10.

If the current time is the circulation operation start time, that is, if Yes in step S10, the controller 23 proceeds to step S310 and determines whether or not a detected concentration Cr, which is the latest carbon dioxide concentration of the indoor air detected by the carbon dioxide sensor 25, is lower than or equal to a predetermined reference concentration Ca. The predetermined reference concentration Ca can be set to any value and is set in advance in the controller 23. Note that the predetermined reference concentration Ca may be stored in the remote control 24.

If the detected concentration Cr is higher than the predetermined reference concentration Ca, that is, if No in step S310, the controller 23 proceeds to step S320 and performs control to start the normal heating-humidifying ventilation operation in which the supply air flow is heated by the air conditioning coil 7 and at the same time normal ventilation is performed by running the supply blower 3 and the exhaust blower 5. The controller 23 thereafter returns to step S310.

If the detected concentration Cr is lower than or equal to the predetermined reference concentration Ca, that is, if Yes in step S310, the controller 23 proceeds to step S20 and performs control to open the bypass opening 21a by outputting an opening operation signal that instructs an opening operation to the motor 19 and opening the bypass damper 18 by causing the bypass damper 18 to be displaced to the open position as illustrated in FIG. 3.

The procedure after step S20 is basically the same as the procedure of the flowchart illustrated in FIG. 5. However, when the supply blower 3 is already in operation in step S30, the controller 23 omits control for running the supply blower 3 and performs control to stop the exhaust blower 5.

Moreover, if the current time is not the circulation operation end time yet in step S60, that is, if No in step S60, the controller 23 returns to step S310. Thus, when detecting that the concentration of the carbon dioxide in the indoor air is higher than the predetermined reference concentration Ca during the indoor circulation humidifying operation on the basis of a result of detection by the carbon dioxide sensor 25, the controller 23 can perform control to temporarily execute the normal heating-humidifying ventilation operation until the concentration reaches the predetermined reference concentration Ca or lower.

As with the first embodiment, the heat exchange ventilator 200 according to the third embodiment can perform humidification of the indoor air efficiently without waste and with low power consumption, thereby being able to greatly cut the time before the humidity of the indoor air reaches the desired indoor humidity which is the target value of the humidity of the indoor air.

Moreover, the heat exchange ventilator 200 according to the third embodiment opens the bypass opening 21a only when the carbon dioxide concentration of the indoor air is lower than or equal to the predetermined reference concentration Ca, and performs the indoor circulation humidifying operation. As a result, the heat exchange ventilator 200 can automatically and efficiently maintain the indoor humidity at a comfortable level with a small amount of power and cut pollution of the indoor air by reducing the carbon dioxide concentration in the room, thereby being able to automatically provide a comfortable indoor environment.

Fourth Embodiment

The ceiling-concealed outdoor air processing unit illustrated in the first to third embodiments above houses the basic functional part of the heat exchange ventilator and the part corresponding to a temperature regulator, which is the functional part for adjusting the temperature of the supply air flow, both in the single housing, so that one can imagine a case where it is difficult in terms of space to provide the bypass function as described above. In such a case, a heat exchange ventilator as described below can be constructed. Note that the heat exchange ventilator described below does not have a humidifier and thus does not have a humidifying function.

Figure 11:
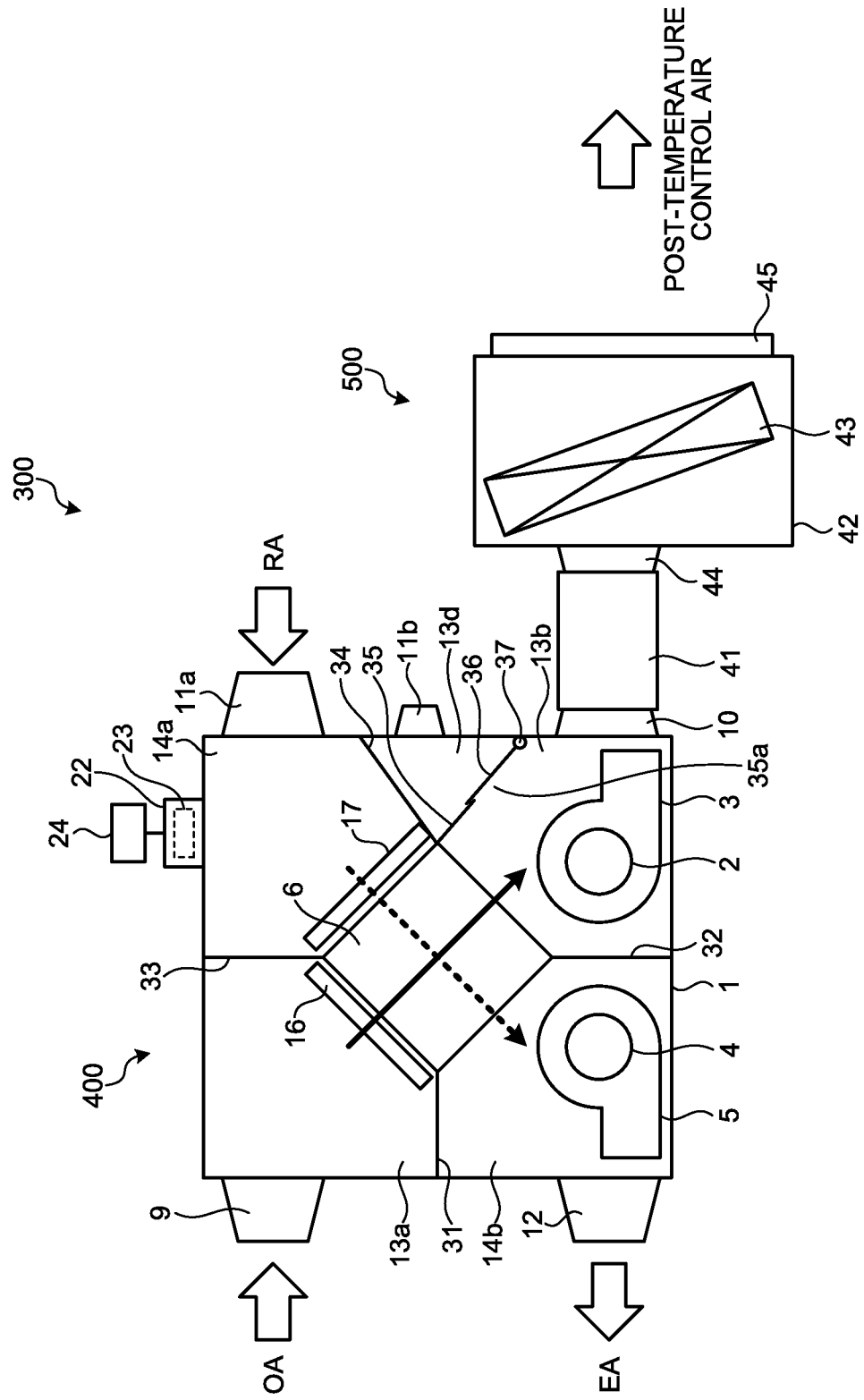
FIG. 11 is a general schematic view of an outdoor air processing system that is seen through from the upper surface side thereof, according to a fourth embodiment of the present invention.
Figure 12:
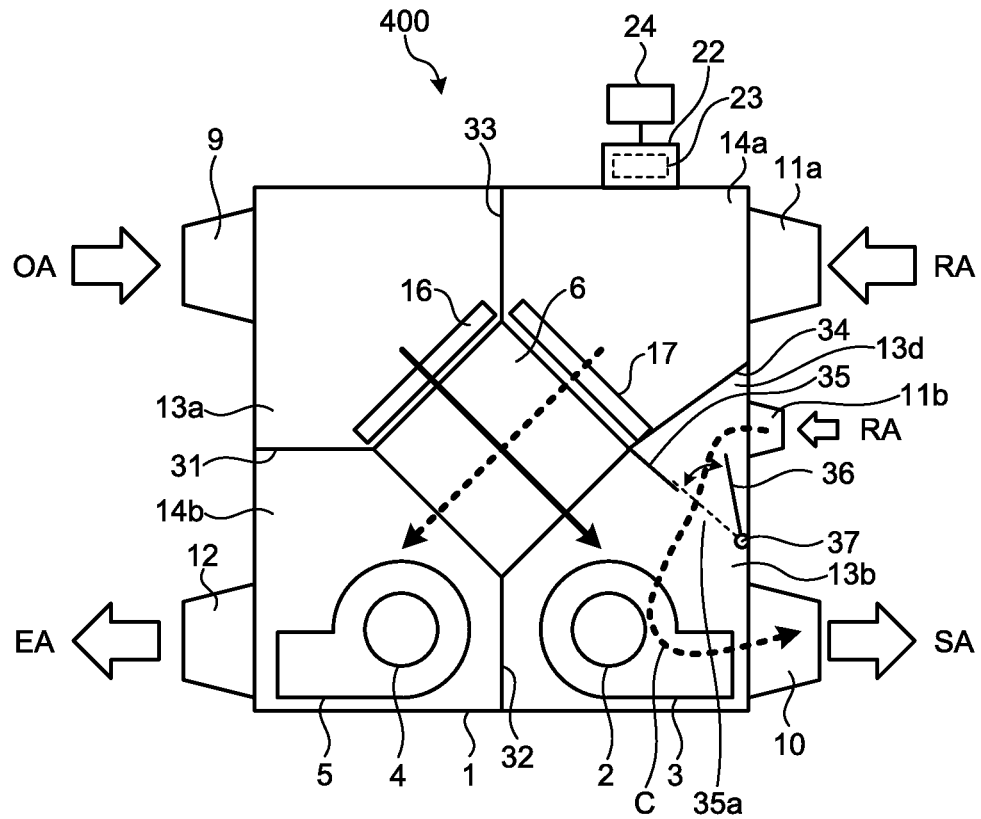
FIG. 12 is a general schematic view of a heat exchange ventilator of the outdoor air processing system that is seen through from the upper surface side thereof, according to the fourth embodiment of the present invention.
Figure 13:
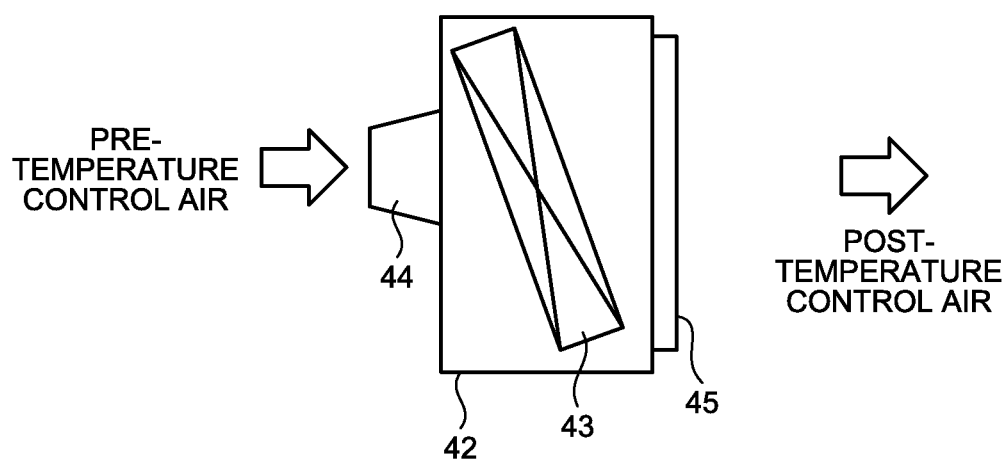
FIG. 13 is a general schematic view of a temperature regulator of the outdoor air processing system that is seen through from the upper surface side thereof, according to the fourth embodiment of the present invention.

An outdoor air processing system 300 according to a fourth embodiment includes a heat exchange ventilator 400 and a temperature regulator 500 connected to the heat exchange ventilator 400 by a connection duct 41. FIG. 11 is a general schematic view of the outdoor air processing system 300 that is seen through from the upper surface side thereof, according to the fourth embodiment of the present invention. FIG. 12 is a general schematic view of the heat exchange ventilator 400 of the outdoor air processing system 300 that is seen through from the upper surface side thereof, according to the fourth embodiment of the present invention. FIG. 13 is a general schematic view of the temperature regulator 500 of the outdoor air processing system 300 that is seen through from the upper surface side thereof, according to the fourth embodiment of the present invention. FIG. 11 illustrates a state in which a bypass opening 35a is closed. FIG. 12 illustrates a state in which the bypass opening 35a is open. Arrows in FIGS. 11 to 13 indicate directions of flow of a supply air flow or an exhaust air flow. Note that in FIGS. 11 to 13, a configuration identical to that of the heat exchange ventilator 100 according to the first embodiment is denoted by the same reference numeral as that assigned to such configuration in the first embodiment, and a detailed description of such configuration will be omitted.

The heat exchange ventilator 400 is a ceiling-concealed outdoor air processing unit that is disposed while hidden above the ceiling. The heat exchange ventilator 400 differs from the heat exchange ventilator 100 according to the first embodiment in that the upstream supply air duct 13a, the downstream supply air duct 13b, the upstream exhaust air duct 14a, and the downstream exhaust air duct 14b are all partitioned by partition walls, and an indoor inlet 11b, a partition wall 32, a partition wall 33, a partition wall 35, a bypass damper 36 as an opening/closing part, and a motor 37 are included. Note that an indoor inlet corresponding to the indoor inlet 11 of the heat exchange ventilator 100 according to the first embodiment is denoted as an indoor inlet 11a.

The housing 1 includes therein a supply air duct and an exhaust air duct that are formed independently of each other, where the supply air duct allows the outdoor inlet 9 being an inlet end and the indoor outlet 10 being an outlet end to communicate with each other via the heat exchanger supply air duct of the total heat exchanger 6 while the exhaust air duct allows the indoor inlet 11a being an inlet end and the outdoor outlet 12 being an outlet end to communicate with each other via the heat exchanger exhaust air duct of the total heat exchanger 6. That is, the interior of the housing 1 is provided with the supply air duct that connects the outside of a building to the inside of a room through the outdoor inlet 9 and the indoor outlet 10 to supply air outside the building into the room, and the exhaust air duct that connects the inside of the room to the outside of the building through the indoor inlet 11a and the outdoor outlet 12 to exhaust air inside the room to the outside of the room.

The upstream supply air duct 13a and the downstream exhaust air duct 14b are partitioned by the partition wall 31. The downstream supply air duct 13b and the downstream exhaust air duct 14b are partitioned by the partition wall 32. The upstream supply air duct 13a and the upstream exhaust air duct 14a are partitioned by the partition wall 33.

Moreover, a bypass air duct 13d is provided in a region between the downstream supply air duct 13b and the upstream exhaust air duct 14a and adjacent to the side surface of the housing 1 where the indoor inlet 11b is provided. The upstream exhaust air duct 14a and the bypass air duct 13d are partitioned by a partition wall 34. The downstream supply air duct 13b and the bypass air duct 13d are partitioned by the partition wall 35 and the bypass damper 36. The bypass air duct 13d communicates with the outside of the housing 1 via the indoor inlet 11b.

A bypass opening 35a is formed in the partition wall 35. The bypass opening 35a is opened and closed by the bypass damper 36 which is the opening/closing part. The bypass opening 35a is provided for the purpose of allowing the indoor air flowing to the bypass air duct 13d through the indoor inlet 11b, that is, the return air, to flow into the downstream supply air duct 13b, or bypassing the return air flowing to the bypass air duct 13d from the outside to the downstream supply air duct 13b. The return air to the bypass air duct 13d from inside the room is formed by the supply blower 3.

The bypass damper 36 is formed of a plate that turns about an axis along the partition wall 35, for example, and is driven by the motor 37 so that one end side of the damper is displaced into the bypass air duct 13d. The bypass damper 36 can be displaced to a closed position to close the bypass opening 35a along the partition wall 35 as illustrated in FIG. 11, and an open position to allow the indoor air flowing into the bypass air duct 13d from the outside to flow as a bypass flow C passing through the bypass opening 35a as illustrated in FIG. 12. Opening and closing of the bypass damper 36 is controlled by the controller 23. That is, the heat exchange ventilator 400 has a bypass function that bypasses the indoor air flowing into the bypass air duct 13d to the downstream supply air duct 13b.

The temperature regulator 500 is provided with a pre-temperature control air intake 44 on one side surface of a housing 42 and a post-temperature control air outlet 45 on another surface of the housing. The pre-temperature control air intake 44 and the post-temperature control air outlet 45 are each formed as a duct connection flange to be connected to a duct. The pre-temperature control air intake 44 is connected to the indoor outlet 10 of the heat exchange ventilator 400 via the connection duct 41. The post-temperature control air outlet 45 communicates with the indoor space via a duct (not illustrated) communicating with a room. The supply air flow flowing into the pre-temperature control air intake 44 through the connection duct 41 from the indoor outlet 10 of the heat exchange ventilator 400 is fed from the post-temperature control air outlet 45 to the indoor space via the duct.

Moreover, an air conditioning coil 43 is disposed inside the temperature regulator 500 and serves as a heat exchanger that exchanges heat with pre-temperature control air entering through the pre-temperature control air intake 44. Thus, as illustrated in FIG. 13, the temperature regulator 500 can heat the supply air flow as the pre-temperature control air flowing into the pre-temperature control air intake 44 and send the air as post-temperature control air from the post-temperature control air outlet 45 to the indoor space via the duct.

As described above, the heat exchange ventilator 400 includes the bypass damper 36 between the downstream supply air duct 13b and the bypass air duct 13d and adjusts the aperture θ of the bypass damper 36 to be able to adjust the circulating air volume of the indoor air through the bypass air duct 13d and the downstream supply air duct 13b, that is, the air volume of the bypass flow C. The aperture θ in this case is an angle formed by the partition wall 35 and the bypass damper 36.

When the bypass opening 35a is closed by the bypass damper 36 in the heat exchange ventilator 400, the bypass air duct 13d and the downstream supply air duct 13b are independent of each other so that the bypass flow C is not generated. On the other hand, when the bypass damper 36 is opened, the bypass air duct 13d and the downstream supply air duct 13b communicate with each other via the bypass opening 35a. As a result, the bypass flow C passing through the bypass opening 35a flows into the downstream supply air duct 13b from the bypass air duct 13d. The heat exchange ventilator 400 can thus perform the operation while returning the indoor air flowing into the bypass air duct 13d from inside the room straight back to the room for circulation therein.

In the cold season, for example, the temperature of the indoor air is higher than the temperature of the supply air flow which is the outdoor air passing through the total heat exchanger 6 and flowing into the downstream supply air duct 13b. Thus, by increasing the circulating volume of the indoor air through the bypass air duct 13d and the downstream supply air duct 13b, the temperature of the supply air flow supplied from the downstream supply air duct 13b to the temperature regulator 500 can be increased as compared with a case where only ventilation is performed with the bypass damper 36 closed.

Therefore, in a case where the supply air flow is heated to a desired temperature in the temperature regulator 500, the supply air flow can be heated in a short time as compared with the case where only ventilation is performed. That is, the temperature regulator 500 heats the air of the supply air flow that is relatively warmer than the air of the supply air flow supplied to the temperature regulator 500 in the ventilation operation performed with the bypass damper 36 closed. This can reduce the heating time of the air conditioning coil 43 and reduce the power required for heating of the air conditioning coil 43, that is, the power required for the outdoor unit of the air conditioner to circulate the refrigerant of a desired temperature to the air conditioning coil 43, whereby the indoor air can be heated with low power consumption. However, the efficiency of ventilating the room decreases in this case.

Similarly, in the hot season, the temperature of the indoor air is lower than the temperature of the supply air flow which is the outdoor air passing through the total heat exchanger 6 and flowing into the downstream supply air duct 13b. Therefore, in a case where the supply air flow is cooled to a desired temperature in the temperature regulator 500, the circulating volume of the indoor air through the bypass air duct 13d and the downstream supply air duct 13b is increased to be able to cool the supply air flow in a short time and with a small amount of power.

In a case where the room needs to be ventilated, on the other hand, the room is efficiently ventilated by decreasing the circulating volume of the indoor air through the bypass air duct 13d and the downstream supply air duct 13b with the aperture of the bypass damper 36 set small, or performing the ventilation operation with the bypass damper 36 closed.

Note that the air volume as the ventilator is decreased when the area of the opening of the indoor inlet 11b is too large, that is, when the volume of the return air of the indoor air as the bypass flow C is too high. Accordingly, the area of the opening of the indoor inlet 11b is preferably set to about 10% to 30% of the area of the opening of the indoor inlet 11a.

Figure 14:
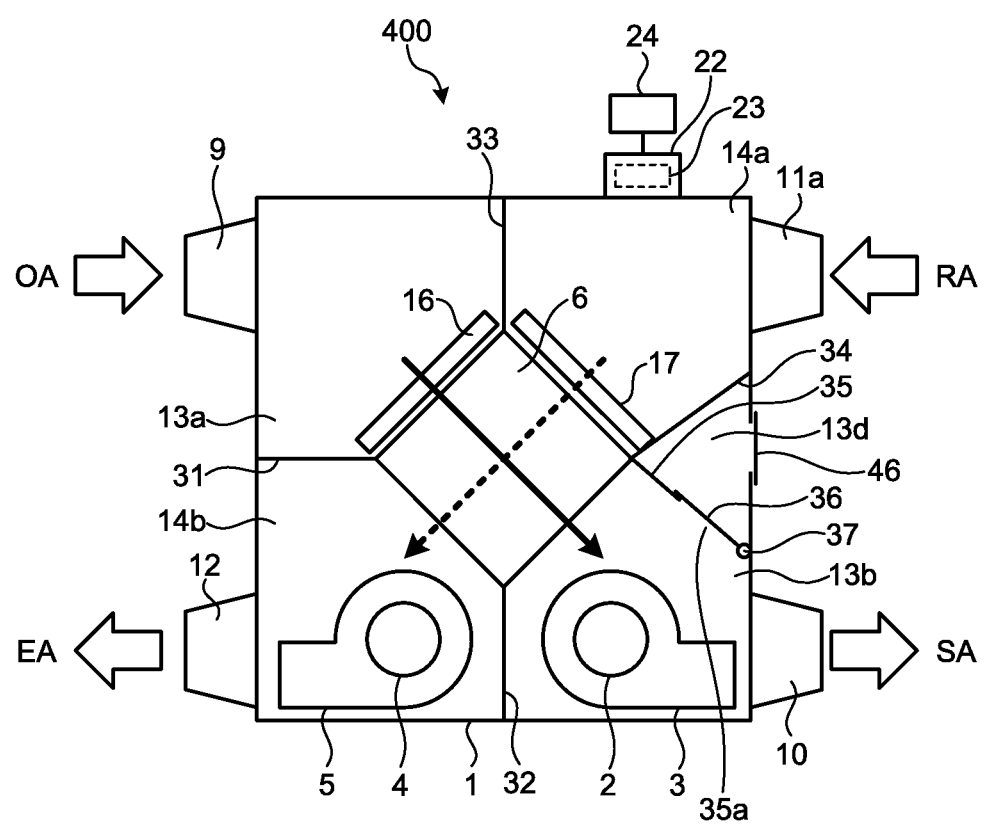
FIG. 14 is a general schematic view of the heat exchange ventilator of the outdoor air processing system that is seen through from the upper surface side thereof, according to the fourth embodiment of the present invention.

FIG. 14 is a general schematic view of the heat exchange ventilator 400 of the outdoor air processing system 300 that is seen through from the upper surface side thereof, according to the fourth embodiment of the present invention. The heat exchange ventilator 400 can be used without being connected to the temperature regulator 500. In this case, as illustrated in FIG. 14, the opening formed at the position of the indoor inlet 11b on the side surface of the heat exchange ventilator 400 is closed by a closing plate 46 for use instead of the indoor inlet 11b.

As described above, the outdoor air processing system 300 according to the fourth embodiment can return the indoor air as the supply air flow via the bypass air duct 13d and the downstream supply air duct 13b. The outdoor air processing system 300 can thus reduce the time for heating or cooling the air conditioning coil 43 when adjusting the temperature of the indoor air. The outdoor air processing system 300 can also reduce the power required for heating or cooling of the air conditioning coil 43, that is, the power required for the outdoor unit of the air conditioner to circulate the refrigerant of a desired temperature to the air conditioning coil 43, whereby the indoor air can be heated with low power consumption.

Therefore, the outdoor air processing system 300 according to the fourth embodiment can efficiently adjust the temperature of the indoor air while reducing or preventing a fluctuation in the temperature of the indoor air by ventilation and increase the temperature of the indoor air in a short time with a small amount of power.

The configurations illustrated in the above embodiments merely illustrate an example of the content of the present invention, and thus the techniques of the embodiments can be combined, or the configurations can be combined with another known technique or partially omitted and/or modified without departing from the scope of the present invention.

REFERENCE SIGNS LIST 1, 42 housing; 1a, 1b, 1c side surface; 2 supply blower motor; 3 supply blower; 4 exhaust blower motor; 5 exhaust blower; 6 total heat exchanger; 7, 43 air conditioning coil; 8 humidifier; 9 outdoor inlet; 10 indoor outlet; 11, 11a, 11b indoor inlet; 12 outdoor outlet; 13a upstream supply air duct; 13b downstream supply air duct; 13c upstream region; 14a upstream exhaust air duct; 14b downstream exhaust air duct; 15 temperature-humidity sensor; 16 supply air filter; 17 exhaust air filter; 18, 36 bypass damper; 19, 37 motor; 20, 21, 31, 32, 33, 34, 35 partition wall; 21a, 35a bypass opening; 22 control box; 23 controller; 24 remote control; 25 carbon dioxide sensor; 41 connection duct; 44 pre-temperature control air intake; 45 post-temperature control air outlet; 46 closing plate; 100, 200, 400 heat exchange ventilator; 101 processor; 102 memory; 300 outdoor air processing system; 500 temperature regulator; Ca reference concentration; Cr detected concentration; EA exhaust air; OA outdoor air; RA return air; SA supply air; Ta reference temperature; Tr detected temperature.

The invention claimed is:

1. A heat exchange ventilator comprising:
a body in which an exhaust air duct for exhausting air in a room to the outside of the room and a supply air duct for supplying air outside the room into the room are formed independently;
a supply blower provided in the supply air duct;
an exhaust blower provided in the exhaust air duct;
a heat exchanger provided in the body to allow heat exchange between air flowing through the supply air duct and air flowing through the exhaust air duct;
a humidifier disposed downstream of the heat exchanger in the supply air duct;
a partition wall including a bypass opening that allows the exhaust air duct upstream of the heat exchanger to communicate with the supply air duct between the heat exchanger and the humidifier, and separating the exhaust air duct upstream of the heat exchanger and the supply air duct downstream of the heat exchanger;
an opening/closing part to open and close the bypass opening; and
a controller configured to perform control to open the bypass opening by the opening/closing part at a first time set in advance, and close the bypass opening by the opening/closing part at a second time set in advance, wherein
the first time corresponds to start of operation of the heat exchange ventilator, and
the second time corresponds to a time after a lapse of a predetermined time set in advance from the start of operation of the heat exchange ventilator, the predetermined time corresponding to a time at which a humidity in the room reaches a desired humidity.

2. The heat exchange ventilator according to claim 1, wherein
the controller performs control to stop the exhaust blower and run the supply blower when the bypass opening is opened by the opening/closing part.

3. The heat exchange ventilator according to claim 1, wherein
in a fully opened position, the opening/closing part is disposed between the heat exchanger and the humidifier upstream of the bypass opening to close the supply air duct.

4. The heat exchange ventilator according to claim 1, further comprising:
an air conditioning coil that is disposed between the heat exchanger and the humidifier in the supply air duct to heat air passing through the supply air duct; and
a temperature sensor that is disposed upstream of the heat exchanger in the exhaust air duct and configured to detect a temperature of air passing through the exhaust air duct, wherein
the bypass opening is disposed between the heat exchanger and the air conditioning coil in the supply air duct, and
when running the supply blower with the bypass opening opened by the opening/closing part, the controller performs control to not heat the air passing through the supply air duct by the air conditioning coil when a temperature detected by the temperature sensor is higher than a predetermined reference temperature, or to heat the air passing through the supply air duct by the air conditioning coil when the temperature detected by the temperature sensor is lower than or equal to the predetermined reference temperature.

5. The heat exchange ventilator according to claim 1, further comprising
a carbon dioxide sensor that is disposed upstream of the heat exchanger in the exhaust air duct to detect a carbon dioxide concentration of air passing through the exhaust air duct, wherein
the controller performs control to run the supply blower with the bypass opening opened by the opening/closing part when a carbon dioxide concentration detected by the carbon dioxide sensor is lower than or equal to a predetermined reference carbon dioxide concentration.

* * * * *